United States Patent
Caliman et al.

(10) Patent No.: US 12,397,520 B2
(45) Date of Patent: Aug. 26, 2025

(54) HONEYCOMB STRUCTURE HAVING IMPROVED THERMAL CONDUCTIVITY

(71) Applicant: Airbus Operations SAS, Toulouse (FR)

(72) Inventors: Laurent Caliman, Toulouse (FR); Florian Ravise, Toulouse (FR); Arnaud Bourhis, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 132 days.

(21) Appl. No.: 18/180,283

(22) Filed: Mar. 8, 2023

(65) Prior Publication Data
US 2023/0286234 A1    Sep. 14, 2023

(30) Foreign Application Priority Data
Mar. 10, 2022   (FR) ...................................... 2202096

(51) Int. Cl.
| | | |
|---|---|---|
| *B29D 24/00* | (2006.01) | |
| *B29C 65/00* | (2006.01) | |
| *B29C 70/08* | (2006.01) | |
| *B29C 70/88* | (2006.01) | |
| *B29L 31/60* | (2006.01) | |

(52) U.S. Cl.
CPC .......... *B29D 24/005* (2013.01); *B29C 66/438* (2013.01); *B29C 70/083* (2013.01); *B29C 70/88* (2013.01); *B29L 2031/608* (2013.01)

(58) Field of Classification Search
CPC . B29L 2031/608; B29C 70/88; B29C 70/083; B29C 66/438; B29D 24/005
See application file for complete search history.

(56) References Cited

U.S. PATENT DOCUMENTS

| 5,288,537 | A | * | 2/1994 | Corden | ................. B29C 70/885 428/116 |
| 5,498,462 | A | * | 3/1996 | Darfler | ................. B29C 53/285 428/116 |
| 5,527,584 | A | | 6/1996 | Darfler et al. | |
| 6,592,963 | B1 | * | 7/2003 | Levit | ................... B29C 65/5057 428/116 |

FOREIGN PATENT DOCUMENTS

FR    3054079 A1    1/2018

OTHER PUBLICATIONS

French Search Report for French Patent Application No. 2202096 dated Oct. 13, 2022; priority document.

* cited by examiner

*Primary Examiner* — Vishal I Patel
(74) *Attorney, Agent, or Firm* — Greer, Burns & Crain, Ltd.

(57) ABSTRACT

A honeycomb structure having a core made up of a plurality of corrugated sheets which are superposed and adhesively bonded together is described. The corrugated sheets are made from a thermally insulating material. Bear filaments are made up of thermally conductive filaments. The honeycomb structure can be used when the ambient temperature exceeds, for example, 120° C.

4 Claims, 3 Drawing Sheets

HONEYCOMB STRUCTURE HAVING IMPROVED THERMAL CONDUCTIVITY

CROSS-REFERENCES TO RELATED APPLICATIONS

This application claims the benefit of the French patent application No. 2202096 filed on Mar. 10, 2022, the entire disclosures of which are incorporated herein by way of reference.

FIELD OF THE INVENTION

The present invention relates to the general field of honeycomb structures and more particularly to honeycomb structures having improved thermal conductivity. The present invention also relates to different methods for manufacturing such a honeycomb structure.

BACKGROUND OF THE INVENTION

In various fields, it is necessary to attenuate noise, for example for an aircraft engine. It is thus known to use an acoustically absorbent material disposed around the source of noise in order to attenuate it.

An acoustically absorbent material takes for example the form of a honeycomb structure 100, as shown in FIG. 1, which has a resistive skin 102 in which holes 103 are created, a bottom skin 104 and cells 106 which are juxtaposed with one another, and which have a hexagonal cross section here. The cells 106 are disposed between the resistive skin 102 and the bottom skin 104.

The resistive skin 102 is oriented towards the source of noise and the holes 103 allow the sound waves to enter the cavities formed by the cells 106.

When the ambient temperature is greater than 120° C., such a honeycomb structure 100 needs to have heat transfer capabilities. In these cases, the cells 106 are made of metal (aluminium) and the honeycomb structure 100 then has, for each skin 102, 104, a glass ply 108a-b which is positioned between the cells 106 and the resistive skin 102 on one side and the bottom skin 104 on the other side in order to provide anti-corrosion protection.

Although such a structure yields reliable results, it is relatively heavy on account of the presence of the metal cells and the glass plies, and it is therefore necessary to find an alternative to this type of structure.

SUMMARY OF THE INVENTION

An object of the present invention is to propose methods for manufacturing honeycomb structure which has improved thermal conductivity.

The invention proposes a method for manufacturing a honeycomb structure, said method comprising:
  a provision step during which a sheet made from a thermally insulating material is provided, wherein at least one of the faces of the sheet bears the filaments made of thermally conductive filaments,
  a shaping step during which said sheet is shaped into the form of a corrugated sheet,
  a stacking and fixing step during which said corrugated sheet is fixed to a similar corrugated sheet obtained during a preceding cycle,
  a step of returning to the provision step until a stack of the desired number of sheets is obtained,
  an impregnating step during which the stack of sheets thus obtained is entirely impregnated with a phenolic resin filled with thermally conductive powder, and
  a polymerizing step during which the phenolic resin is polymerized.

The invention also proposes a method for manufacturing a honeycomb structure, said method comprising:
  a provision step during which a sheet made from a thermally insulating material is provided, wherein at least one of the faces of the sheet bears the filaments made of thermally conductive filaments,
  an impregnating step during which the sheet thus provided is entirely impregnated with a thermoplastic resin filled with thermally conductive powder,
  a consolidating step during which the sheet thus impregnated is consolidated to yield an impregnated sheet,
  a shaping step during which said impregnated sheet is shaped into the form of a corrugated sheet,
  a stacking and fixing step during which said corrugated sheet is fixed to a similar corrugated sheet obtained during a preceding cycle,
  a step of returning to the provision step until a stack of the desired number of sheets is obtained, and
  a polymerizing step during which the thermoplastic resin is polymerized.

The invention also proposes a method for manufacturing a honeycomb structure, said method comprising:
  a provision step during which a sheet to be fixed and made from a thermally insulating material is provided, wherein at least one of the faces of the sheet bears the filaments made of thermally conductive filaments,
  a stacking and fixing step during which said sheet to be fixed is fixed to a similar sheet to be fixed obtained during a preceding cycle,
  a step of returning to the provision step until a stack of the desired number of sheets is obtained,
  a stretching step during which the stack of sheets thus obtained is stretched parallel to the stacking direction in order to shape the sheets of the stack into the form of corrugated sheets,
  an impregnating step during which the stack of sheets thus obtained is entirely impregnated with a phenolic resin filled with thermally conductive powder, and
  a polymerizing step during which the phenolic resin is polymerized.

Advantageously, the manufacturing method has, before the stacking and fixing step, a glue application step during which glue is applied to the fixing surfaces of the sheets.

According to one particular embodiment, the independent filaments are fixed to the sheet by impregnating the filaments with a resin or a glue, then by applying the filaments thus impregnated to the sheet, and then by polymerizing the whole.

According to one particular embodiment, the filaments are in the form of a lattice, and the lattice is fixed to the sheet by impregnating the lattice with a resin or a glue, then by applying the lattice thus impregnated to the sheet, and then by polymerizing the whole.

According to one particular embodiment, the filaments are in the form of a lattice, and the lattice is fixed to the sheet by applying strips of glue to the sheet where the filaments are intended to be disposed, then by depositing and embedding the lattice in the strips of glue, and then by polymerizing the whole.

BRIEF DESCRIPTION OF THE DRAWINGS

The features of the invention mentioned above, along with others, will become more clearly apparent upon reading the following description of an exemplary embodiment, said description being given with reference to the appended drawings, in which.

DETAILED DESCRIPTION OF THE PREFERRED EMBODIMENTS

Figure 1:
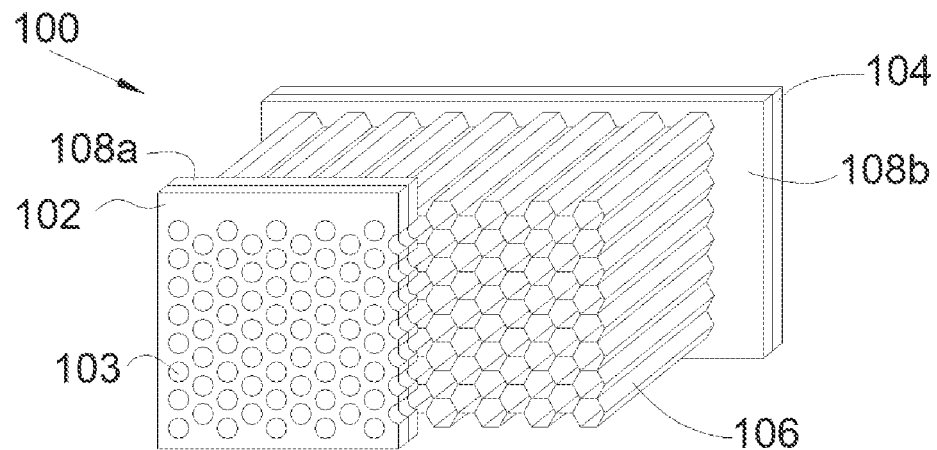
FIG. 1 is a perspective view of a honeycomb structure of the prior art.
Figure 2:
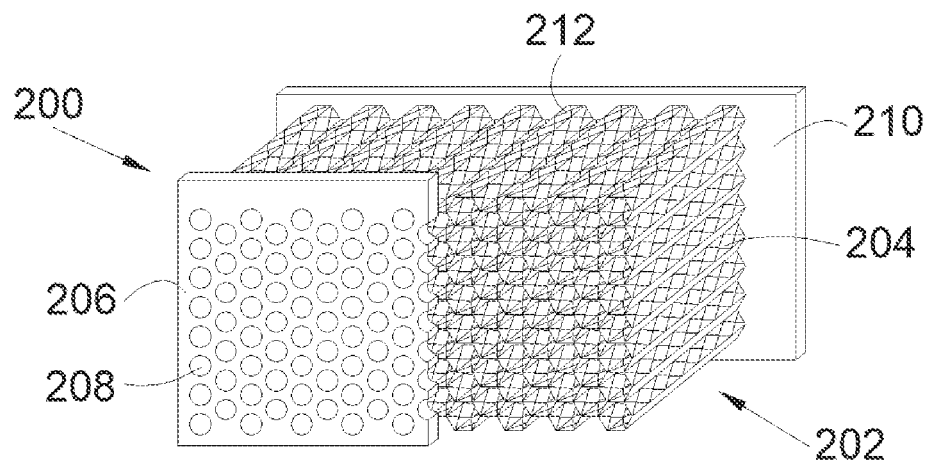
FIG. 2 is a perspective view of a honeycomb structure according to the invention.

FIG. 2 shows a honeycomb structure 200 according to the invention, which has a core 202 made up of cells 204 that are juxtaposed with one another and have a hexagonal cross section.

Figure 3:
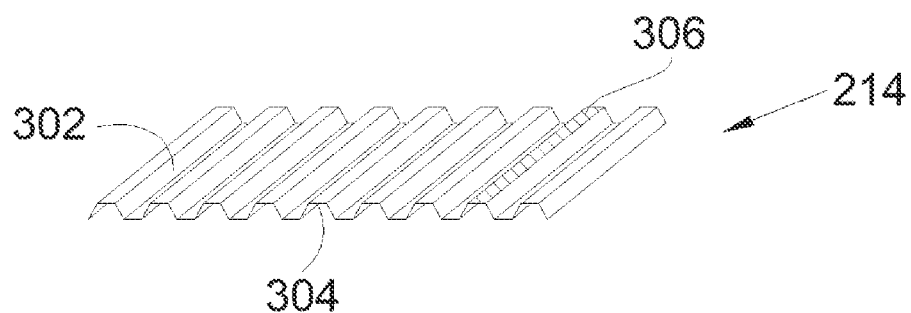
FIG. 3 is a perspective view of a corrugated shape forming a core of the honeycomb structure.

The core 202 is made up of a plurality corrugated sheets 214 which are superposed and fixed together and an example of which is shown in FIG. 3.

Each corrugation has a trapezoidal cross section with, alternately, a first corrugation 302 which is open at the large base of the trapezium on a first side of the corrugated sheet 214, in this case at the top, and a second corrugation 304 which is open at the large base of the trapezium on a second side of the corrugated sheet 214, in this case at the bottom. When two corrugated sheets 214 are fixed together, they are offset with respect to one another such that a first corrugation of the lower corrugated sheet 214 is faces a second corrugation of the upper corrugated sheet 214 so as to create the cells 204 of hexagonal cross section between the two corrugated sheets 214 fixed in this way.

The two corrugated sheets 214 are fixed along a fixing surface 306 corresponding to the small base of the trapezium, which is also referred to as "node". According to one embodiment, the fixing involves adhesively bonding the fixing surfaces 306 together and according to another embodiment, the fixing involves welding the fixing surfaces 306 together.

In the embodiment of the invention presented in FIG. 2, the honeycomb structure 200 has a resistive skin 206 in which holes 208 are created and a bottom skin 210 which are fixed on either side of the core 202 at the ends of the cells 204.

The core 202 and the cells 204 are thus disposed between the resistive skin 206 and the bottom skin 210.

The resistive skin 206 is intended to be oriented towards a source of noise such that the sound waves pass into the cells 106 by passing through the holes 208.

The cells 204 and therefore the corrugated sheets 214 are made from a thermally insulating material, for example a paper, which is to say a non-woven and porous element or a woven element, for example an aromatic polyamide referred to as aramid paper and which may be non-woven and porous or woven.

The skins 206 and 210 may take the form of a thermosetting, thermoplastic or hybrid element, as in the case of the prior art.

To improve the thermal conductivity of the core 202, at least one of the faces of the corrugated sheets 214 bears filaments 212 made up of thermally conductive filaments, for example metal filaments such as copper, bronze, or aluminium. Depending on the material used to make the filaments, the electrical conductivity of the core 202 may also be improved. The cross section of the filaments may be square, circular, or rectangular or the like. The filaments 212 may be in the form of a lattice of filaments that cross one another and are fixed together or of filaments that cross one another and are independent of one another.

The filaments 212 are fixed to a face of the corrugated sheet 214 by a glue or a resin, for example a phenolic or thermoplastic resin, which fixes the filaments 212 to the corrugated sheet 214.

Each corrugated sheet 214 extends parallel to the corrugations 302 and 304 between two ends, wherein a first end is secured to the resistive skin 206 and a second end is secured to the bottom skin 210.

Filaments 212 extend between the two ends and the two skins 206 and 210. The presence of the thermally conductive filaments in the core 202 makes the latter thermally conductive and it can then be used for applications in which the ambient temperature exceeds certain thresholds, for example 120° C.

The filaments 212 cross one another and thus take different forms. The filaments may be oriented at 45° with respect to the edges of the sheet, as shown in the figures, or at 90° or any other orientations.

Figure 4:
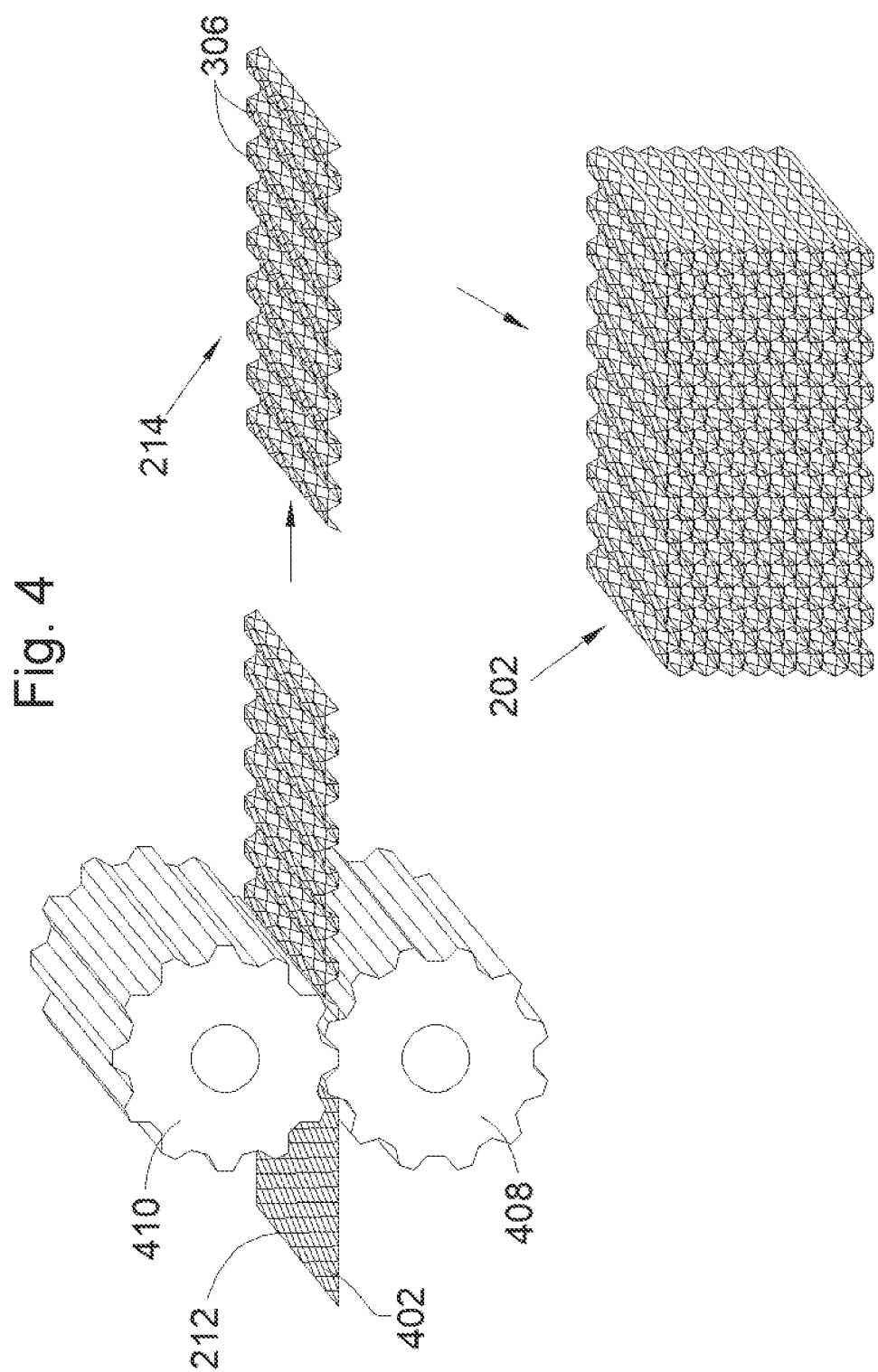
FIG. 4 is a schematic depiction of the steps of a first method for manufacturing the honeycomb structure according to the invention.

FIG. 4 shows a first method for manufacturing the core 202, each cell 204 of which has a hexagonal cross section.

The first manufacturing method comprises:
- a provision step during which a sheet 402, in particular a sheet of non-woven and porous or woven aramid paper, is provided, the sheet 402 bearing filaments 212 and being able to be in the form of a sheet or a roller to be cut following provision, and
- a shaping step during which said sheet 402 is shaped into the form of a corrugated sheet 214, such as the one described with reference to FIG. 3,
- a stacking and fixing step during which said corrugated sheet 214 is fixed to a similar corrugated sheet 214 obtained during a preceding cycle, the fixing being effected via the fixing surfaces 306,
- a step of returning to the provision step until a stack of the desired number of sheets is obtained,
- an impregnating step during which the stack of sheets thus obtained is entirely impregnated with a phenolic resin, and
- a polymerizing step during which the phenolic resin is polymerized in order to obtain the core 202.

The shaping step is carried out for example by passing the sheet 402 between two rotating rollers 408 and 410 that each have impressions in their periphery. Thus, during the passage of the sheet 402 between the two rollers 408 and 410, the impressions in said rollers 408 and 410 deform the sheet 402 so as to form the corrugations 302 and 304.

The impregnating step is carried out for example by dipping the stack of corrugated and fixed sheets entirely in a bath of phenolic resin in the form of a fluid.

In the case of adhesive bonding, the polymerizing step makes it possible to also polymerize the glue.

The polymerizing step depends on the phenolic resin and, in the case of adhesive bonding, on the glue used and uses the features recommended for said phenolic resin and said glue, in particular at a temperature of around 180° C. The polymerizing step also solidifies the glue or the resin fixing the filaments 212.

In the case of adhesive bonding, the manufacturing method has, before the stacking and fixing step, a glue application step during which glue is applied to the fixing surfaces 306 of said corrugated sheet 214.

In the case of welding, the latter is carried out during the stacking and fixing step.

Figure 5:
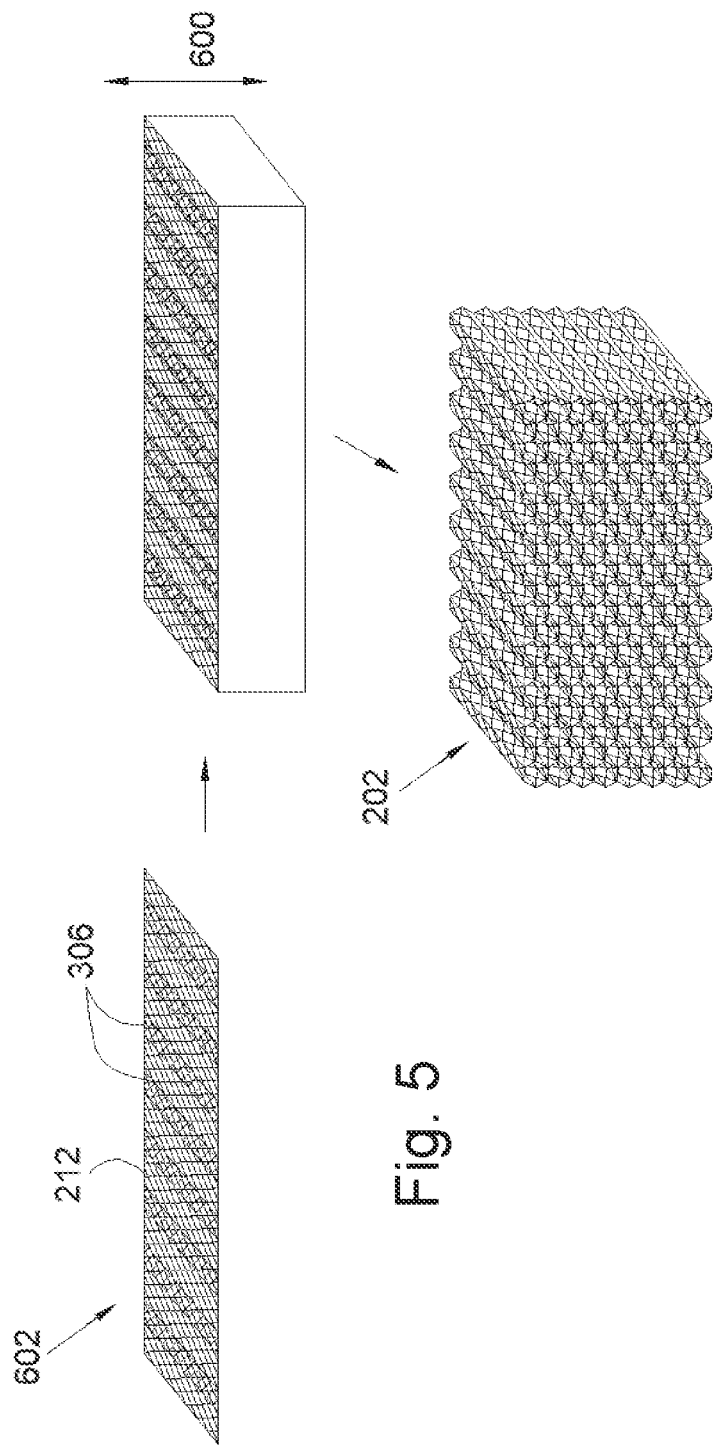
FIG. 5 is a schematic depiction of the steps of a second method for manufacturing the honeycomb structure according to the invention.

FIG. 5 shows a second method for manufacturing the core 202, each cell 204 of which has a hexagonal cross section.

The second manufacturing method comprises:
- a provision step during which a sheet 602 to be fixed, in particular a sheet of non-woven and porous or woven aramid paper, is provided, the sheet 602 to be fixed bearing filaments 212 and being able to be in the form of a sheet or a roller to be cut following the provision step,
- a stacking and fixing step during which said sheet 602 to be fixed is fixed to a similar sheet 602 to be fixed obtained during a preceding cycle, the fixing being effected via the fixing surfaces 306,
- a step of returning to the provision step until a stack of the desired number of sheets is obtained,
- a stretching step during which the stack of sheets thus obtained is stretched (double-headed arrow 604) parallel to the stacking direction in order to shape the sheets of the stack into the form of corrugated sheets 214 such as the one described with reference to FIG. 3,
- an impregnating step during which the stack of sheets thus obtained is entirely impregnated with a phenolic resin, and
- a polymerizing step during which the phenolic resin is polymerized in order to obtain the core 202, in particular at a temperature of around 180° C.

The impregnating step is carried out for example by dipping the corrugated and fixed sheets entirely in a bath of phenolic resin in the form of a fluid.

The polymerizing step depends on the phenolic resin and, in the case of adhesive bonding, on the glue used and uses the features recommended for said phenolic resin and said glue. The polymerizing step also solidifies the glue or the resin fixing the filaments 212.

In the case of adhesive bonding, the manufacturing method has, before the stacking and fixing step, a glue application step during which glue is applied to the fixing surfaces 306 of said sheet to be fixed so as to yield a glued sheet.

In the case of welding, the latter is carried out during the stacking and fixing step.

FIG. 4 also shows a third method for manufacturing the core 202, each cell 204 of which has a hexagonal cross section.

The third manufacturing method comprises:
- a provision step during which a sheet, in particular a sheet of non-woven and porous or woven aramid paper, is provided, the sheet bearing filaments 212,
- an impregnating step during which the sheet thus provided is entirely impregnated with a thermoplastic resin,
- a consolidating step during which the sheet thus impregnated is consolidated to yield an impregnated sheet 402,
- a shaping step during which said impregnated sheet 502 is shaped into the form of a corrugated sheet 214 which takes the same form as that described with reference to FIG. 3 but in which the sheet is impregnated and consolidated,
- a stacking and fixing step during which said corrugated sheet 214 is fixed to a similar corrugated sheet 214 obtained during a preceding cycle, the fixing being effected via the fixing surfaces 306,
- a step of returning to the provision step until a stack of the desired number of sheets is obtained, and
- a polymerizing step during which the thermoplastic resin is polymerized in order to obtain the core 202, in particular at a temperature of around 180° C.

The impregnating step is carried out for example by dipping the sheet entirely in a bath of thermoplastic resin in the form of a fluid.

The consolidating step consists for example of polymerization of the thermoplastic resin in particular a temperature lower than 400° C.

The shaping step is carried out for example by passing the impregnated sheet 402 between two rotating rollers 408 and 410 that each have impressions in their periphery. Thus, during the passage of the impregnated sheet 402 between the two rollers 408 and 410, the impressions in said rollers 408 and 410 deform the impregnated sheet 402 so as to form the corrugations 302 and 304. An increase in temperature of the impregnated and consolidated sheet in order to soften it during the shaping step makes it easier to create the corrugations.

In the case of adhesive bonding, the polymerizing step makes it possible to also polymerize the glue.

The polymerizing step depends on the thermoplastic resin and, in the case of adhesive bonding, on the glue used and uses the features recommended for said thermoplastic resin and said glue.

In the case of adhesive bonding, the manufacturing method has, before the stacking and fixing step, a glue application step during which glue is applied to the fixing surfaces 306 of said corrugated sheet 214.

In the case of welding, the latter is carried out during the stacking and fixing step.

After the core 202 has been produced, the skins 206 and 210 are fixed at the ends of the cells 204 by any means known to a person skilled in the art, for example by adhesive bonding.

Before a sheet bearing the filaments 212 is provided, it is necessary to fix said filaments 212 to said sheet, and to this end different solutions are conceivable.

When the filaments 212 are in the form of independent filaments, the filaments 212 are fixed to the sheet by impregnating the filaments with a resin or a glue, in particular a phenolic or thermoplastic resin or glue, then by applying the filaments thus impregnated to the sheet, and then by polymerizing the whole.

When the filaments 212 are in the form of a lattice of filaments, the lattice is fixed to the sheet by impregnating the lattice with a resin or a glue, in particular a phenolic or thermoplastic resin or glue, then by applying the lattice thus impregnated to the sheet, and then by polymerizing the whole.

When the filaments 212 are in the form of a lattice of filaments, the lattice is fixed to the sheet by pre-gluing, that is to say be applying strips of glue to the sheet where the filaments 212 are intended to be disposed, then by depositing and embedding the lattice in the strips of glue, in particular by pressure, and then by polymerizing the whole.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a honeycomb structure, said method comprising:
    a provision step during which a sheet to be fixed and made from a thermally insulating material is provided, wherein a face of the sheet to be fixed bears filaments made of thermally conductive filaments;
    a stacking and fixing step during which said sheet to be fixed is fixed to a similar sheet to be fixed obtained during a preceding cycle;
    a step of returning to the provision step until a stack of the desired number of sheets is obtained;
    a stretching step during which the stack of sheets thus obtained is stretched parallel to a stacking direction in order to shape the sheets of the stack into a corrugated form;
    an impregnating step during which the stack of sheets thus obtained is entirely impregnated with a phenolic resin; and
    a polymerizing step during which the phenolic resin is polymerized,
    wherein, prior to the provision step, the filaments are independent of the sheet, then fixed to the sheet by impregnating the filaments with a resin or a glue, then by applying the filaments thus impregnated to the sheet to form an assembly,
    wherein the assembly is impregnated with the phenolic resin during the impregnating step,
    wherein, during the polymerizing step, the glue or the resin fixing the filaments to the sheet is solidified.

2. The manufacturing method according to claim 1, wherein the manufacturing method has, before the stacking and fixing step, a glue application step during which glue is applied to fixing surfaces of the sheets.

3. The manufacturing method according to claim 1, wherein the filaments are in the form of a lattice, and in that the lattice is fixed to the sheet by impregnating the lattice with the resin or the glue, then by applying the lattice thus impregnated to the sheet to form the assembly, and then by polymerizing the entirety of the assembly.

4. The manufacturing method according to claim 1, wherein the filaments are in the form of a lattice, in that the lattice is fixed to the sheet by applying strips of glue to the sheet where the filaments are intended to be disposed, then by depositing and embedding the lattice in the strips of glue to form the assembly, and then by polymerizing the entirety of the assembly.

* * * * *